Figure 1:
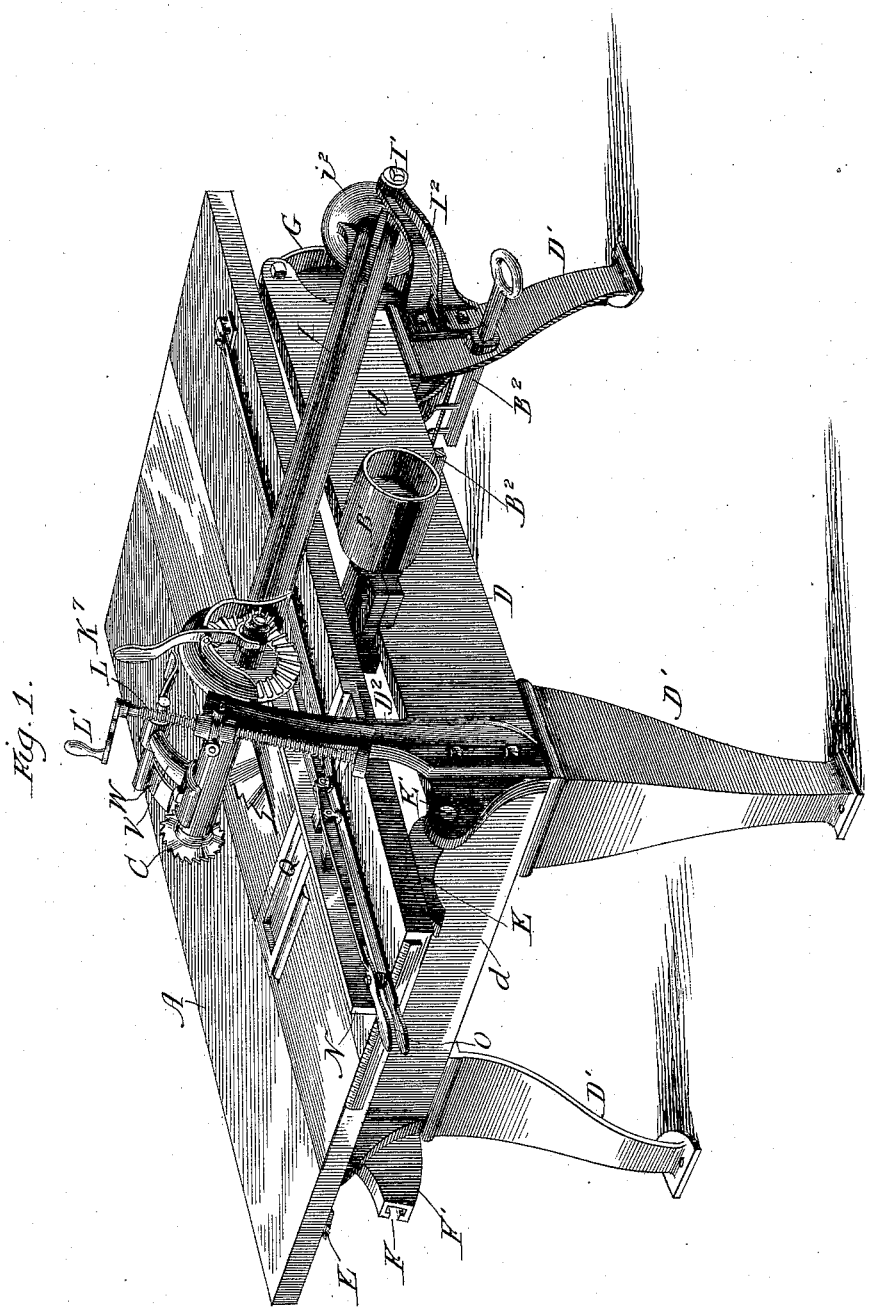

(No Model.) 3 Sheets—Sheet 1.

G. B. DURKEE.
POWER FEED SAWING MACHINE.

No. 383,112. Patented May 22, 1888.

Witnesses:
Frank J. Blanchard
Frank W. Severin

Inventor:
George B. Durkee
By Chas. G. Page
his Attorney.

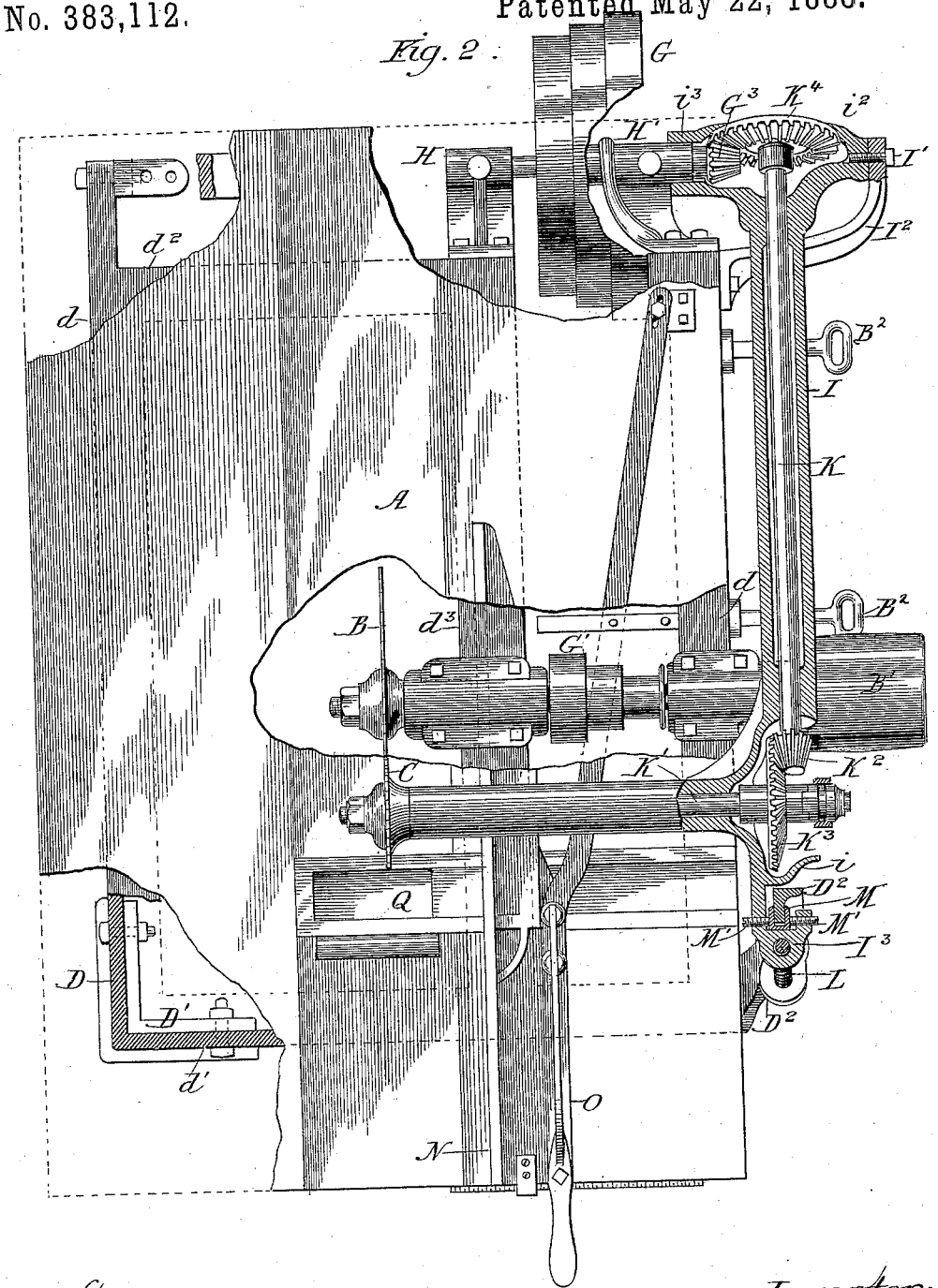

(No Model.) 3 Sheets—Sheet 3.
G. B. DURKEE.
POWER FEED SAWING MACHINE.
No. 383,112. Patented May 22, 1888.
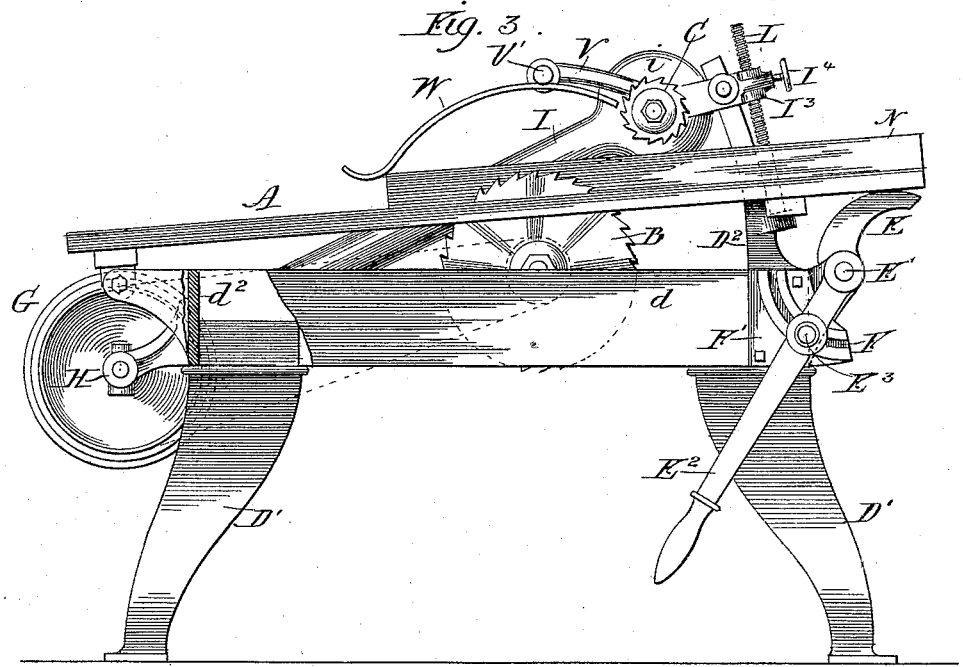
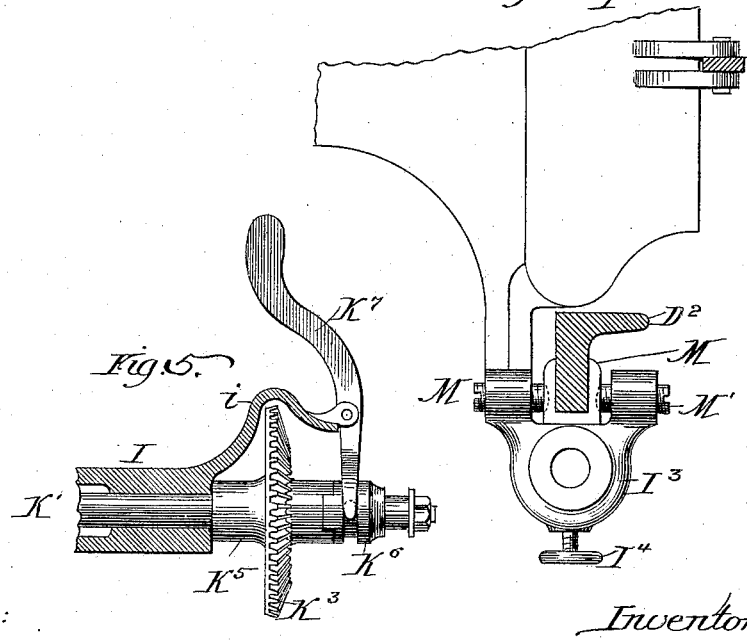
Witnesses:
Frank J. Blanchard
Frank W. Sereno
Inventor.
George B. Durkee
By Chas G. Page
his Attorney.

UNITED STATES PATENT OFFICE.

GEORGE B. DURKEE, OF CHICAGO, ILLINOIS, ASSIGNOR TO JOSEPH W. TAFT, OF SAME PLACE.

POWER-FEED SAWING-MACHINE.

SPECIFICATION forming part of Letters Patent No. 383,112, dated May 22, 1888.

Application filed August 1, 1885. Serial No. 173,297. (No model.)

*To all whom it may concern:*

Be it known that I, GEORGE B. DURKEE, a citizen of the United States, residing at Chicago, in the county of Cook and State of Illinois, have invented certain new and useful Improvements in Power-Feed Sawing-Machines, of which the following is a specification.

My invention relates more particularly to improvements in sawing-machines of that class in which a power-driven feed-wheel for feeding the work forward to the saw is mounted upon an adjustable support which can be raised and lowered in order to adjust the position of the feed-wheel with reference to the thickness of the work. In machines of such character the saw is usually mounted below and arranged to extend up through the table, and the table is commonly arranged to be tilted or raised and lowered, as occasion may require.

The objects of my invention are, first, to improve the construction and increase the efficiency of sawing-machines constructed upon the foregoing principle; secondly, to arrange the feed-wheel support so that when it is adjusted to raise the feed-wheel the latter, in place of being thrown in a direction abruptly away from the saw, as has heretofore been the case, will be carried in the arc of a circle proximately concentric with the axis of the saw, in which way the feed-wheel, which always stands in advance of the saw, will, irrespective of its adjustments, be maintained at a proximately uniform and comparatively short distance from the peripheral portion of the saw that is exposed above the saw-table, so that the feed-wheel will in acting upon the end of the work at the termination of the forward feed of the latter engage the same at a point sufficiently close to the saw to insure a proper completion of the feed; thirdly, to provide means whereby without interfering with the free up-and-down adjustment of the feed-wheel support the said support can be set or adjusted laterally to the line of feed in order to line up the feed-wheel with the saw, should such adjustment at any time during the use of the machine be found necessary; fourthly, to dispense with the use of an adjusting-screw for raising and lowering the tilting table, and to provide means whereby the table can be raised and lowered with greater ease and rapidity; fifthly, to provide an organization whereby the employment of but one belt in the machine is rendered necessary, and hence a saving in belting effected; sixthly, to provide certain novel and improved details of construction, all tending to increase the general efficiency of the machine.

I will describe the construction of a machine embodying my invention by reference to the accompanying drawings, and hereinafter specifically indicate the features which I regard as novel.

In the drawings, Figure 1 is a perspective view of the sawing-machine involving my invention. Fig. 2 is a top plan view, with parts of the table broken away and certain other parts of the machine shown in section—for example, a corner portion of the bed-frame and the tilting feed-wheel support. Fig. 3 represents a side elevation of the machine with one of the rear corners of the bed-frame broken away. Fig. 4 is a detail showing a top plan of the bent portion of the tilting feed-wheel support with the guide-standard in cross-section. Fig. 5 is a detail showing in part section and part elevation the clutch and a portion of the tilting feed-wheel support.

The machine herein shown is provided with a tilting table, A, upon which the work is to be placed, a rotary circular saw, B, mounted below the table in position to extend up through an opening in the same, and a rotary feed-wheel, C, arranged overhead in position to feed the work forward to the saw. The table is arranged over and hinged at or near one end to a bed-frame, D, upon which latter the rotary saw-shaft is mounted, the table being adapted to be raised or lowered independently of the saw, as occasion may require. The hinge-connection between the table and the bed-frame is desirably made at a point back of the saw, or at what may be termed the "rear" or "delivery" end of the machine, so that the table can be raised and lowered from the opposite or front end.

The means for raising and lowering the table consist of one or more cams, E, (by preference two,) formed with or secured upon a rock-shaft, E', which is mounted at the front end of the bed-frame in bearings desirably formed by extensions from the two front corners of the bed-frame. The rock-shaft lies horizontally below the free end of the table, which latter at this end rests upon the cams. The rock-shaft is operated by a handle, E², Fig. 3, secured to one end of the rock-shaft and arranged to swing at one side of the bed-frame within convenient reach of an operator standing in front of the machine. By turning the rock-shaft the cams thereon can be adjusted in position to either raise or lower the table, as may be desired, and the cams can be held in their adjustment by means suitable for locking the rock-shaft against rotation.

As a simple and convenient way of locking the rock-shaft, its handle or lever is provided with a set-screw, E³, having one end formed to fit and slide in a curved groove, F, which is made T-shaped in cross-section, as in Fig. 1, and in a plate, F', which is bolted to one side of the bed-frame. By properly adjusting the set-screw E³ the handle, which is rigid with the rock-shaft, can be locked at any desired point along the curved groove, and hence the rock-shaft held against rotation.

The bed-frame is of cast metal and rectangular in shape, and is supported upon metal legs D', which are made angular in cross-section and fitted to the inner corners of the bed-frame. Preferably the legs are provided with shoulders, upon which the bed-frame rests, and the bed-frame and its said supporting-legs are rigidly bolted together—as, for example, as in Fig. 2, wherein a portion of the table is broken away, and one corner portion of the bed-frame shown in horizontal section. The saw-shaft is mounted upon the bed-frame at a point between the front and rear ends of the latter, and is extended out from one side of the bed-frame to receive a belt-pulley, B', to which power may be applied by a driving-belt.

The bed-frame is essentially composed of a pair of longitudinally-arranged side bars, $d\ d$, a transversely-arranged front end bar, $d'$, which extends the full width of the frame, a transversely-arranged rear end bar, $d^2$, which unites with one of the side bars, but terminates short of the opposite side bar, and a longitudinally-arranged division piece or bar, $d^3$, which extends back from the front end bar, $d'$, to the rear end bar, $d^2$. The object of such construction is to provide appropriate bearings for the saw-shaft, which is arranged transversely to and supported upon one of the two longitudinal bars $d$ and the bar $d^3$, and also to provide at the rear end of the machine space suitable for a cone-pulley, G, which is mounted at the rear end of the bed-frame, and belt connected with a cone-pulley, G', arranged upon the saw-shaft. The belt employed to connect together these two cone-pulleys passes below the table, and is the only belt with which the sawing-machine is provided, it being understood that a belt from shafting overhead, which may be applied to the pulley upon the saw-shaft, is not regarded as a part of the sawing-machine, but as belonging to the fixtures in such place as power necessary to drive the machine may be found. The axle of the rear cone-pulley, G, is mounted in bearings H H', secured to the rear end of the bed-frame, as best shown in Fig. 2, wherein the belt between the two cone-pulleys is indicated in dotted lines. The belt which connects the cone or speed pulleys can be shifted to vary the speed by means of belt-shifters B² B², arranged between the cone-pulleys and applied to slide through and extend out from one side of the bed-frame or the bed-frame and one of the supporting-legs.

The rotary feed-wheel C is driven from the axle of the rear cone or speed pulley, and is mounted at one end of a tilting support, I, which serves to carry certain power-transmitting devices employed to connect the feed-wheel with a gear upon the axle of the rear speed-pulley.

The tilting feed-wheel support, which carries the feed-wheel at one of its ends, is at its opposite end pivoted below the level of the table at a point at or near the rear end of the machine. From its pivotal point of support the feed-wheel support I extends up alongside the machine to a point somewhat above the level of the table, from whence it extends over and part way across the table, so as to bring the feed-wheel in line with the saw.

The power-transmitting devices carried by the tilting feed-wheel support constitute a system of geared shafting, which is driven from a bevel gear, G³, upon the axle of the rear speed-pulley.

The tilting support I is desirably made hollow, so as to form in effect a bent tube having one arm inclined upwardly from the pivotal point of support and its other arm arranged horizontally over the table. This hollow or tubular tilting support for the feed-wheel serves as a means for inclosing two rotary shafts, K and K', which are desirably fitted to work within the hollow support and appropriately geared together at the bend or angle thereof by a pair of bevel-gears, K² and K³.

The rotary shaft K is arranged to extend through the inclined portion of the hollow tilting support, and is provided at its lower end with a bevel-gear, K⁴, engaging the bevel-gear G³ upon the rear speed-pulley axle, while the shaft K', which is extended through the horizontal portion of the hollow tilting support, is provided at one end with the feed-wheel C.

The hollow feed-wheel support I is expanded both at its bend and at its lower pivoted end, so as to provide at such points casings suitable for the bevel-gears, the expansion at the bend providing a casing, $i$, which serves as a guard for the gears K² and K³, and the expansion at the lower end providing a casing, $i^2$, which serves as a similar guard for the gears G³ and K⁴. As a convenient way of pivoting the said feed-wheel support, its lower enlarged end is at one side provided with a neck, $i^3$, fitted to turn upon one end of the bearing H', through which the rear cone-pulley axle extends, and at its opposite side mounted upon a pivot, I', secured in a bracket, I², which is attached to the bed-frame.

As a result of pivoting the feed-wheel support at a point below the level of the table and in rear of the saw, the feed-wheel will be maintained at a proximately uniform distance from the saw irrespective of any tilting adjustment of its support—as, for example, when the feed-wheel support is tilted up from its lowest position the feed-wheel will be swung in a direction back over the saw and will be kept closer up to the same than could be attained if its support were pivoted above the level of the table.

By the foregoing arrangement the feed-wheel can be the better kept down to the work, and will be maintained under all ordinary circumstances sufficiently near the saw to obtain the best results in sawing. The tilting feed-wheel support can be raised or lowered by means of an adjusting-screw, L, arranged to work through a bearing, I³, which is formed with or secured to the tilting support at or near the bend in the latter. This screw is desirably provided at its upper end with a handle, L', and at its lower end is stepped in a bearing formed in or upon a bracket, D², attached to the bed-frame.

In order to more positively hold the tilting feed-wheel support in such position as it may have been brought by the adjusting screw, the bearing I³ is provided with a set-screw, I⁴, which can be tightened up against the adjusting-screw L.

The tilting feed-wheel support yields or bends to some extent to a pressure exerted against its upper portion in a direction laterally to the line of feed, in view of which means are herein provided for guiding the feed-wheel support in its tilting movement and for adjusting its upper free end portion laterally to the line of guide, so that should the feed-wheel, by reason of wear or other causes incident to use, work out of line with the saw the tilting support can be adjusted in a direction proper to line up the feed-wheel, in order that the track which it makes upon the work shall be obliterated by the cut. To such end the feed-wheel support is guided in its swinging or tilting movement by a guide, which is formed by the curved standard D², attached to and rising from the bed-frame. The tilting support carries at or near its end a block, M, which is grooved to fit and slide along the guide-standard, and held in connection with the tilting support by means of a pair of set-screws, M' M', which work through bearings in or upon the tilting support and engage the block, respectively, at opposite sides thereof, as best shown in Fig. 5.

The bearings for the set-screws are respectively at opposite sides of the guide standard and the sliding block, and are set apart sufficiently to provide between their inner opposing ends and the sides of the block-space suitable to admit to some extent an adjustment or side movement of the upper portion of the tilting support in a direction lateral to the guide-standard, in which way, by adjusting the screws M', the free end portion of the tilting support can be set so as to line up the feed-wheel and at the same time permit the said support to be tilted so as to raise or lower the feed-wheel.

The set-screws M' can have a swivel-connection with the slide block or bearing M in any convenient way—as, for instance, the inner opposing ends of the set screws can be fitted to turn in sockets formed in the sides of the slide-block or sliding bearing M, as indicated in dotted lines.

N indicates an adjustable gage, which, while not herein claimed, is desirably employed, and is arranged to slide over the table transversely to the line of feed. The gage is shifted and adjusted into proper position by means of a hand-lever, O, which has its front or handle end extended somewhat out from the front end of the table, and its opposite end pivotally attached upon the table by means of a pivot arranged to pass through a slot with which the lever is provided at this point. The lever O is at a point between its ends pivotally connected with a slide, P, which latter is formed with or secured to the gage N and arranged to slide within a grooved way, Q, sunk in the table and formed at right angles to the line of feed.

As a means for connecting or disconnecting the feed-wheel with or from the driving-power the gear K³ is secured upon a sleeve, K⁵, arranged to run loose on shaft K' and adapted to constitute one member of a clutch. The other member, K⁶, of the clutch is keyed to slide upon and turn with the shaft or axle K⁴ of the feed-wheel, and is thrown into or out of clutch with the sleeve K⁵ by a small clutch-lever, K⁷, which is fulcrumed upon the tilting feed-wheel support at or near the bend thereof.

The upper horizontal portion of the tilting feed-wheel support is desirably provided with an arm, V, in which is adjustably secured a pin, V', carrying a guard, W, arranged to overhang the saw, as usual. The table will also be provided with rollers—one in front and the other in rear of the saw—so as to facilitate the feed of the work, one of said rollers being shown at W' partially countersunk in the table in the usual way. The table will also be provided at its front edge with a scale, as at W², for service in connection with the gage-lever.

What I claim as my invention is—

1. In a power-feed sawing-machine, an inclined tilting support for the feed-wheel, hinged at one end below the level of the table at a point back of the saw, and extended above and over the table to bring the feed-wheel in front of the saw, substantially as described.

2. The inclined tilting feed-wheel support hinged at one end below the level of the table at a point back of the saw, and extended above and over the table to bring the feed-wheel in front of the saw, combined with the feed-wheel and power-transmitting device carried by the tilting feed-wheel support, substantially as described.

3. The bent hollow feed-wheel support pivoted at one end below the level of the table and at a point back of the saw and extended above and over the table to bring the feed-wheel in front of the saw, in combination with the feed-wheel and geared shafting carried by the said hollow support, substantially as described.

4. The inclined tilting feed-wheel support hinged at its lower end, in combination with a standard rising from the main frame and constituting a guide for the upper free end portion of the tilting feed-wheel support, and means for adjusting the said feed-wheel support at its upper free end portion laterally to the guide-standard, whereby the feed-wheel can under all circumstances be kept in line with the saw and at the same time a free tilting movement on the part of its support be admissible, substantially as described.

5. The tilting feed-wheel support hinged at its lower end, in combination with the guide-standard rising from the main frame and constituting a guide for the upper free end portion of the inclined tilting feed wheel support, and the slide-block supported between a pair of adjusting screws carried by the tilting feed-wheel support and fitted to slide upon the guide-standard, substantially as described.

6. In a power-feed sawing-machine, the tilting feed-wheel support carrying a feed-wheel and a power-transmitting mechanism, such as described, in combination with the two belt-connected speed-pulleys arranged below the table, the axle of one speed-pulley being provided with the saw and an ordinary belt pulley, and the axle of the other speed-pulley being provided with a gear engaging a gear which is carried by the tilting feed-wheel support, and which forms a member of the power-transmitting mechanism with which said tilting feed-wheel support is provided, substantially as set forth.

7. In combination with the saw and feed-wheel, the hollow bent feed-wheel support I, expanded at its bend and at one end, geared shafting carried by said hollow support, with the gears situated at the expanded portions thereof, and means, substantially as described, for driving the geared shafting.

8. The combination, with the table A, of a rectangular bed-frame, D, provided with a longitudinal division-bar, $d^3$, the rotary saw, and a pair of belted speed-pulleys, the saw-shaft being journaled upon the bar $d^3$ and one side of the frame, and the cone-pulleys being mounted between said side of the frame and the bar $d^3$, substantially as described.

9. In a sawing-machine, the table hinged at or near one end upon a bed-frame on which the circular saw is mounted in position to extend up through an opening in the table, in combination with a rock-shaft provided with cams arranged to sustain the free end portion of the table, and means, substantially as described, for operating the rock-shaft and holding it in adjustment, for the purpose set forth.

10. The combination, with the bed-frame D, arranged below the hinged table, of the two speed-pulleys on shafts supported by the bed-frame, one of said shafts being provided with a circular saw which extends up through the table, the tilting feed-wheel support, the feed-wheel, power-transmitting devices connecting the feed-wheel with the shaft of the other one of said cone-pulleys, and one or more belt-shifters operative between the two speed-pulleys, substantially as described.

GEORGE B. DURKEE.

Witnesses:
 CHAS. G. PAGE,
 F. W. SEVERIN.